(12) United States Patent
Honda et al.

(10) Patent No.: US 6,976,788 B2
(45) Date of Patent: Dec. 20, 2005

(54) THRUST BEARING

(75) Inventors: Tadashi Honda, Nihonmatsu (JP); Katsumi Sekine, Nihonmatsu (JP); Shigeru Watanabe, Nihonmatsu (JP)

(73) Assignee: NOK Corporation, Tokyo (JP)

( * ) Notice: Subject to any disclaimer, the term of this patent is extended or adjusted under 35 U.S.C. 154(b) by 79 days.

(21) Appl. No.: 10/471,745

(22) PCT Filed: Mar. 27, 2002

(86) PCT No.: PCT/JP02/03001

§ 371 (c)(1),
(2), (4) Date: Sep. 24, 2003

(87) PCT Pub. No.: WO02/77473

PCT Pub. Date: Mar. 10, 2002

(65) Prior Publication Data
US 2004/0105601 A1    Jun. 3, 2004

(30) Foreign Application Priority Data
Mar. 27, 2001    (JP) .............................. 2001-089193

(51) Int. Cl.$^7$ ........................ F16C 32/06; F16C 33/10
(52) U.S. Cl. .................................... 384/123; 384/305
(58) Field of Search ........................ 384/100, 121–124, 384/303, 305, 368, 420

(56) References Cited

U.S. PATENT DOCUMENTS

| 4,326,758 A | * | 4/1982 | Nozue et al. ............... 384/368 |
| 4,348,065 A | * | 9/1982 | Yoshioka et al. ........... 384/121 |
| 4,522,513 A |   | 6/1985 | Nozue et al. ............... 384/368 |
| 4,728,201 A |   | 3/1988 | Abbe ......................... 384/121 |
| 4,772,188 A |   | 9/1988 | Kimura et al. ................ 418/55 |
| 5,399,141 A | * | 3/1995 | Takahashi .................... 384/123 |
| 6,089,754 A |   | 7/2000 | Wilkes et al. ............... 384/122 |
| 6,132,094 A |   | 10/2000 | Cornelison et al. ......... 384/121 |

FOREIGN PATENT DOCUMENTS

| CN | 1256370 A   | 6/2000 |
| DE | 3714536 A1  | 11/1987 |
| EP | 1008773 A1  | 6/2000 |
| JP | 55-132415   | 10/1980 |
| JP | 58-166120   | 10/1983 |
| JP | 59-187110   | 10/1984 |
| JP | 60-18614    | 1/1985 |
| JP | 62-267588   | 11/1987 |
| JP | 1-133559    | 9/1989 |
| JP | 2-501844    | 6/1990 |
| JP | 3-123118    | 12/1991 |
| JP | 11-170397   | 6/1999 |
| JP | 2000-186712 | 7/2000 |
| KR | 89-3271     | 8/1989 |
| WO | WO88/04740  | 6/1988 |

* cited by examiner

Primary Examiner—Thomas R. Hannon
(74) Attorney, Agent, or Firm—Jacobson Holman PLLC

(57) ABSTRACT

In a thrust bearing supporting a load in a thrust direction in a rotary portion, a size of a curved surface in the forward side of a lubricating groove with respect to a relative rotating direction of an opposing sliding member is set to be larger than a size of a curved surface in the rearward side of the lubricating groove with respect to the relative rotating direction, and a depth of the lubricating groove is set to be deeper than a starting point in the side of a groove bottom of the curved surface formed in the groove shoulder in the forward side of the lubricating groove with respect to the rotating direction, so that a lubricating effect and a cooling effect are increased.

2 Claims, 11 Drawing Sheets

THRUST BEARING

This is a nationalization of PCT/JP02/03001 filed Mar. 27, 2002 and published in Japanese.

TECHNICAL FIELD

The present invention relates to a thrust bearing which supports a load in the thrust direction in a rotation portion.

BACKGROUND ART

A stator of a torque converter in an automatic transmission of a motor vehicle can rotate only in one direction by a one-way clutch, and a thrust load applied to the stator is supported by a thrust bearing. In the thrust bearing of the torque converter, a low friction is required for the purpose of reducing a loss of power energy transmission under a high speed driving condition so as to improve a specific fuel consumption. Accordingly, as this kind of thrust bearing, there has been employed a needle bearing, or a copper washer or the like. However, since the needle bearing and the copper washer are expensive, needs for a synthetic resin thrust bearing which can be inexpensively manufactured have been increased in recent years.

FIGS. 14A and 14B show a synthetic resin thrust bearing in accordance with a conventional art which is used in a torque converter or the like, in which FIG. 14A is a front view as seen from the side of a sliding surface, and FIG. 14B is a partly enlarged cross sectional view cut along a line XIV—XIV in FIG. 14A. As shown in the figures, in this kind of synthetic resin thrust bearing 100, a lot of lubricating grooves 102 extending in the radial direction are formed on a sliding surface 101 at a predetermined interval in the circumferential direction. Each of the lubricating grooves 102 is provided so as to supply a lubricating oil to the sliding surface 101, and groove shoulders 102a and 102b in both sides are formed as curved surfaces or chamfer portions having the same size.

However, in the conventional synthetic resin thrust bearing 100 shown in FIGS. 14A and 14B, since the lubricating oil introduced into the lubricating grooves 102 is hard to be sufficiently supplied to the lubricating surface 101, and further, since a depth d of the lubricating grooves 102 is shallow, a cooling effect achieved by the lubricating oil introduced into the lubricating grooves 102 is not sufficient. Furthermore, because of the above insufficiency, there have been pointed out problems such that a friction with an opposing sliding member is high, a performance of the torque converter is lowered, and the specific fuel consumption is increased.

The present invention is made by taking the problems mentioned above into consideration, and a technical object of the present invention is to provide a thrust bearing supporting a thrust load of a rotation portion, in which a friction with an opposing sliding member can be sufficiently lowered even when the thrust bearing is made of a synthetic resin.

DISCLOSURE OF THE INVENTION

As a means for effectively achieving the technical object mentioned above, in accordance with a first aspect of the present invention, there is provided a thrust bearing comprising:

a lot of lubricating grooves formed on a sliding surface at a predetermined interval in the circumferential direction; and curved surfaces formed in groove shoulders of each of the lubricating grooves, wherein a size of the curved surface in the forward side of the lubricating groove with respect to a relative rotating direction of an opposing sliding member is set to be larger than a size of the curved surface, or the chamfer portion in place thereof, in the rearward side of the lubricating groove with respect to the relative rotating direction.

In accordance with a second aspect of the present invention, there is provided thrust bearing as recited in the first aspect, wherein a depth of the lubricating groove is set to be deeper than a starting point in the side of a groove bottom of the curved surface formed in the groove shoulder in the forward side of the lubricating groove with respect to the rotating direction.

In accordance with a third aspect of- the present invention, there is provided a thrust bearing as recited in the first aspect or the second aspect, wherein a step portion for enlarging a groove width toward the curved surface in the same side groove shoulder is formed in the forward side of the lubricating groove with respect to the relative rotating direction of the opposing sliding member.

In accordance with a fourth aspect of the present invention, there is provided a thrust bearing as recited in the first aspect or the second aspect, wherein a groove inner wall in the forward side of the lubricating groove with respect to the relative rotating direction of the opposing sliding member is inclined such that the groove width is enlarged toward the curved surface in the same side groove shoulder.

In accordance with a fifth aspect of the present invention, there is provided a thrust bearing as recited in any one of the first aspect to the fourth aspect, wherein a depth of the groove bottom of the lubricating groove is made gradually shallower from an end portion in the inner peripheral side toward an end portion in the outer peripheral side.

BRIEF DESCRIPTION OF THE DRAWINGS

FIGS. 1A and 1B show a first embodiment of a thrust bearing in accordance with the present invention, in which FIG. 1A is a front view as seen from the side of a sliding surface, and FIG. 1B is a partly enlarged cross sectional view cut along a line I—I in FIG. 1A;

FIGS. 4A and 4B show an operation of a lubricating groove in accordance with the present invention in comparison with an operation of the lubricating groove in accordance with the conventional art, in which FIG. 4A is an explanatory view of the operation in accordance with the present invention, and FIG. 4B is an explanatory view of the operation in accordance with the conventional art;

FIGS. 7A and 7B show a second embodiment of the thrust bearing in accordance with the present invention, in which FIG. 7A is a front view as seen from the side of a sliding surface, and FIG. 7B is a partly enlarged cross sectional view cut along a line VII—VII in FIG. 7A;

FIGS. 8A and 8B show a third embodiment of the thrust bearing in accordance with the present invention, in which FIG. 8A is a front view as seen front the side of a sliding surface, and FIG. 8B is a partly enlarged cross sectional view cut along a line VIII—VIII in FIG. 8A;

FIGS. 9A and 9B show a fourth embodiment of the thrust bearing in accordance with the present invention, in which FIG. 9A is a front view as seen from the side of a sliding surface, and FIG. 9B is a partly enlarged cross sectional view cut along a line IX—IX in FIG. 9A;

FIGS. 10A and 10B show a fifth embodiment of the thrust bearing in accordance with the present invention, in which FIG. 10A is a front view as seen from a side of a sliding surface, and FIG. 10B is a partly enlarged cross sectional view cut along a line X—X in FIG. 10A;

FIGS. 11A and 11B show a sixth embodiment of the thrust bearing in accordance with the present invention, in which FIG. 11A is a front view as seen from a side of a sliding surface. and FIG. 11B is a partly enlarged cross sectional view cut along a line XI—XI in FIG. 11A;

FIGS. 14A and 14B show a synthetic resin thrust bearing in accordance with the conventional art, in which FIG. 14A is a front view as seen from the side of a sliding surface, and FIG. 14B is a partly enlarged cross sectional view cut along a line XIV—XIV in FIG. 14A.

BEST MODE FOR CARRYING OUT THE INVENTION

Figure 1A:
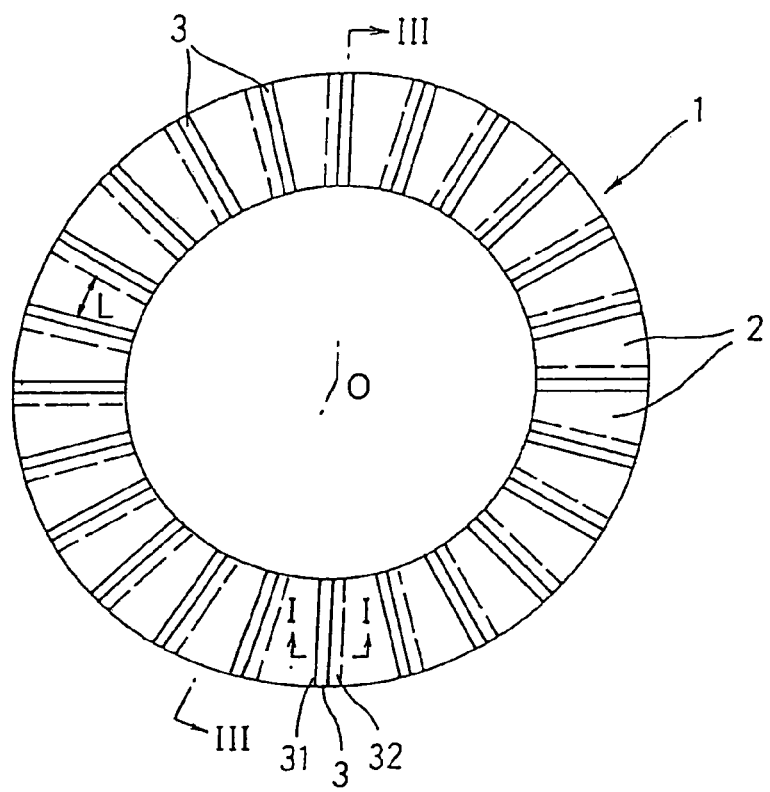
Figure 1B:
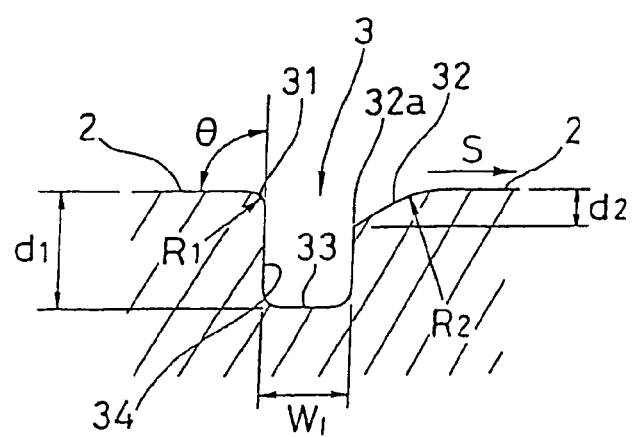
Figure 2:
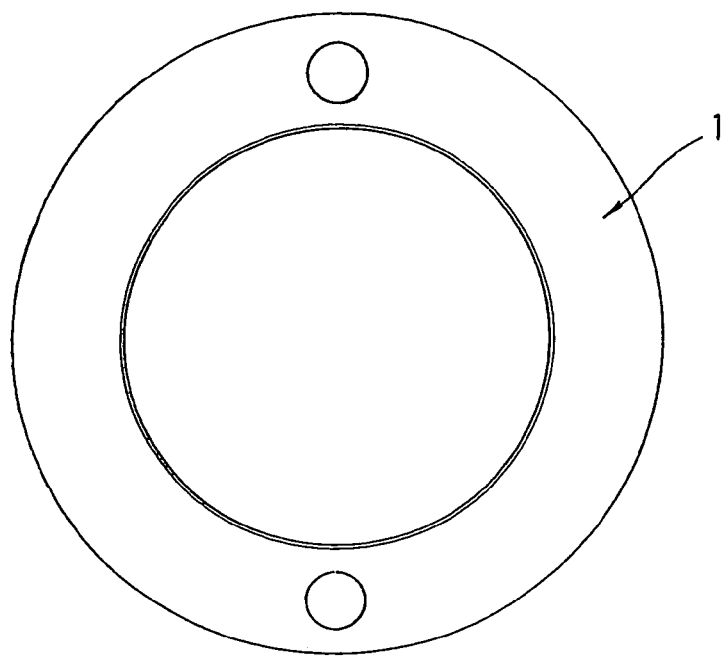
FIG. 2 is a back view showing the first embodiment of the thrust bearing in accordance with the present invention.
Figure 3:
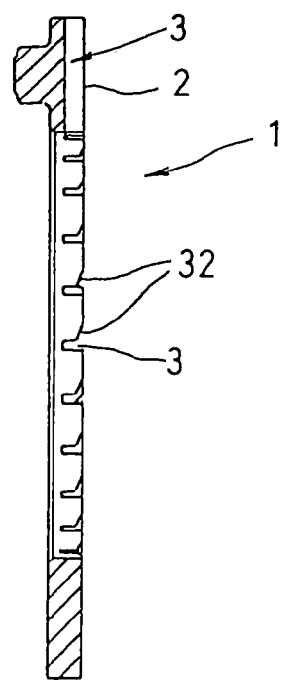
FIG. 3 is a cross sectional view cut along a line III-O-III in FIG. 1A.

FIGS. 1A and 1B show a thrust bearing in accordance with a first embodiment, in which FIG. 1A is a front view as seen from the side of a sliding surface, and FIG. 1B is a partly enlarged cross sectional view cut along a line I—I in FIG. 1A, FIG. 2 is a back view of the same thrust bearing, and FIG. 3 is a cross sectional view cut along a line III-O-III in FIG. 1A.

A thrust bearing 1 in accordance with the present embodiment is made of a synthetic resin and formed in a flat annular shape, and is structured such as to support a thrust load of a rotation member rotating only in one direction, for example, a stator of a torque converter in an automatic transmission of a motor vehicle. The thrust bearing 1 is structured such that one end surface in the axial direction forms a sliding surface 2 with an opposing sliding member, and a lot of lubricating grooves 3 extending in the radial direction are formed on the sliding surface 2 at a predetermined interval in the circumferential direction.

In each of the lubricating groove 3, a groove width W1 is set, for example, about 1.4 mm, and curved surfaces 31 and 32 having different sizes are formed in groove shoulders arranged in both sides of the lubricating groove 3. In particular, a relatively small first curved surface 31 is formed in the groove shoulder in the rearward side of the lubricating groove 3 with respect to a relative rotating direction S of an opposing sliding member facing to the sliding surface 2, among the groove shoulders in both sides of the lubricating groove 3, and a radius R1 of curvature of the first curved surface 31 is set to be 0.5 mm or less. Further, a relatively large second curved surface 32 is formed in the groove shoulder in the forward side of the lubricating groove 3 with respect to the relative rotating direction S of the opposing sliding member, and a radius R2 of curvature of the second curved surface 32 is set to be substantially larger than the radius R1 of curvature of the first curved surface 31. In the present embodiment, the radius R1 of curvature of the first curved surface 31 is formed, for example, about 0.3 mm, and the radius R2 of curvature of the second curved surface 32 is formed, for example, about 2 mm.

A depth d1 of a groove bottom 33 in each of the lubricating grooves 3 is formed deeper than a starting point 32a in the side of the groove bottom 33 in the second-curved-surface 32. In the present embodiment, a depth d2 of the starting point 32a with respect to the sliding surface 2 is, for example, about 0.7 mm, and the depth d1 of the groove bottom 33 is deeper than it and, for example, about 1.95 mm.

Further, an angle θ of a groove inner wall in the rearward side of the lubricating groove 3 with respect to the relative rotating direction S of the opposing sliding member, that is, a groove inner wall 34 in the side of the first curved surface 31 forms an angle between 80 and 90 degrees toward the opposite side to the rotating direction S, with respect to the sliding surface 2, preferably forms an angle of 90 degrees with respect to the sliding surface 2. Further, a width L in the peripheral direction of the sliding surface 2 is set to be, for example, about 6 mm in a center portion in the radial direction.

Figure 4:
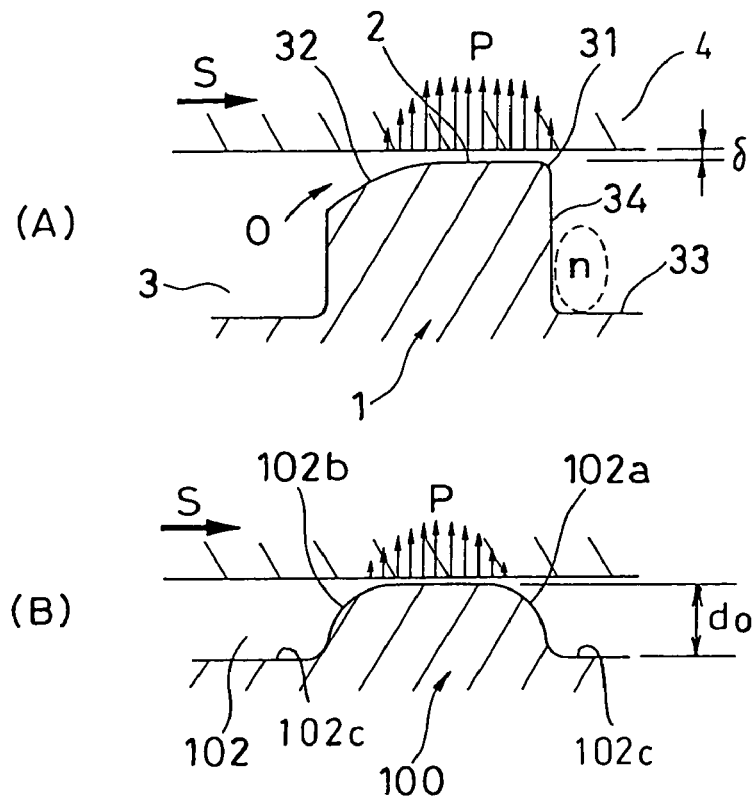
Figure 5:
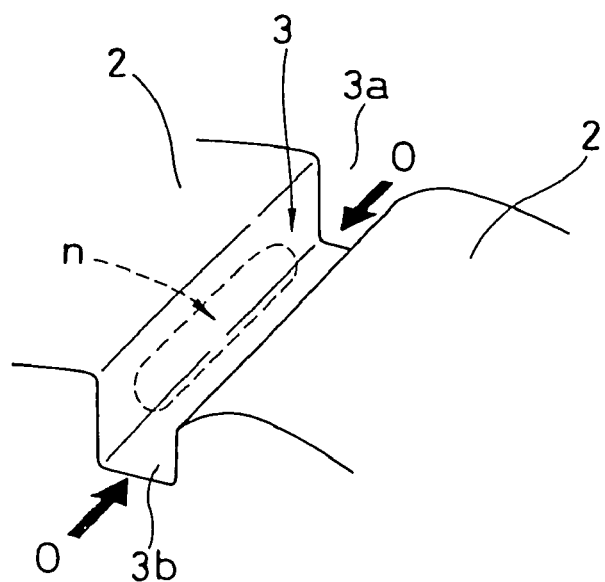
FIG. 5 is a perspective view showing the operation of the lubricating groove in accordance with the present invention.

FIGS. 4A and 4B are explanatory views showing comparatively an operation of the lubricating groove 3 in accordance with the present embodiment and an operation of the lubricating groove in accordance with the conventional art, and FIG. 5 is a perspective view showing the operation of the lubricating groove 3 in accordance with the present embodiment. The thrust bearing 1 in accordance with the present embodiment is structured, as shown in FIG. 4A, such that when the opposing sliding member 4 facing to the sliding surface 2 of the thrust bearing 1 in the thrust direction relatively rotates in the direction of an arrow S, in other words, the counterclockwise direction in FIG. 1A, a lubricating oil O introduced into the lubricating groove 3 runs over the sliding surface 2 from the second curved surface 32 in the forward side of the lubricating groove 3 with respect to the rotating direction S in such a manner that the lubricating oil O is drawn in by the opposing sliding member 4. Since the radius R2 of curvature and the depth of the starting point 32a of the second curved surface 32 is larger than the radius R1 of curvature of the first curved surface 31, the lubricating oil O tends to interpose into a sliding gap δ between the sliding surface 2 and the opposing sliding member 4 from the lubricating groove 3, and consequently, a wedge effect of the lubricating oil O is increased in accordance with the structure that the gap is reduced with respect to the relative rotating direction S of the opposing sliding member 4, whereby an effective bearing pressure P is generated.

On the other hand, since the first curved surface 31 in the opposite side to the second curved surface 32 is structured such as to enlarge the gap with respect to the relative rotating direction S of the opposing sliding member 4, a reverse wedge effect of drawing out a lubricating oil film from the sliding gap δ between the sliding surface 2 and the opposing sliding member 4 is generated in correspondence to the sliding motion of the opposing sliding member 4. However, since the radius R1 of curvature of the first curved surface 31 is substantially small in comparison with the radius, R2 of curvature of the second curved surface 32, the reverse wedge effect achieved by the first curved surface 31 is small in comparison with the wedge effect achieved by the second curved surface 32. In particular, when the radius R1 of curvature of the first curved surface 31 is set to be 0.5 mm or less, the revere wedge effect is hardly generated.

Further, when the angle θ of the groove inner wall 34 in the side of the first curved surface 31 is small, the reverse wedge effect is generated thereby. However, since the angle θ is approximately 90 degrees. in the present embodiment, the reverse wedge effect caused by the groove inner wall 34 is hardly generated.

On the contrary, in the thrust bearing 100 in accordance with the conventional art shown in FIG. 4B, a groove shoulder 102b causing generation of the bearing pressure P on the basis of the wedge effect in the forward side of a lubricating groove 102 with respect to the rotating direction S, and a groove shoulder 102a causing generation of the reverse wedge effect in the rearward side of the lubricating groove 102 are formed so as to have the same radius of curvature with each other. Accordingly, the wedge effect achieved by the curved surface 102b is cancelled by the reverse wedge effect achieved by the curved surface 102a, so that the bearing pressure P can not be enlarged.

Thus, on the basis of the thrust bearing 1 in accordance with the present embodiment, it is possible to obtain a remarkable bearing pressure P for expanding the sliding gap δ. Accordingly, even when the thrust bearing 1 is made of the synthetic resin, a friction between the opposing sliding member 4 and the sliding surface 2 is reduced, and it is possible to effectively reduce a loss of power energy. Further, it is therefore possible to improve a performance of the torque converter and it is possible to improve the specific fuel consumption.

Further, in the thrust bearing 100 in accordance with the conventional art shown in FIG. 4B, since a groove bottom 102c is continuous from the curved surfaces of the groove shoulders 102a and 102b, a groove depth d0 is shallow and is about 0.5 mm, so that the lubricating oil is less flown within the lubricating groove 102.

On the other hand, in the present embodiment, the depth d1 of the groove bottom 33 in the lubricating groove 3 is deeper than the starting point 32a in the side of the groove bottom 33 in the second curved surface 32, and the angle θ of the groove inner wall 34 in the rearward side of the lubricating groove 3 with respect to the rotating direction S forms the angle between 80 and 90 degrees toward the opposite side to the rotating direction S with respect to the sliding surface 2. Accordingly, a negative pressure portion n is generated near the groove inner wall 34 within the lubricating groove 3. Further, as described above, since the reverse wedge effect of drawing out the lubricating oil film from the sliding gap δ is small in the first curved surface 31, the lubricating oil O is supplied to the negative pressure portion n not from the sliding gap δ but from both ends 3a and 3b in the radial direction of the lubricating groove 3 in major part, as shown in FIG. 5. In particular, since a centrifugal force is applied to the lubricating oil, the lubricating oil is introduced into the lubricating groove 3 mainly from the inner peripheral side of the thrust bearing 1 (the end portion 3a of the lubricating groove 3).

Therefore, since the lubricating oil can be actively flown between the inner and outer peripheries of the thrust bearing 1 and the lubricating groove 3, it is possible to increase a cooling effect of the sliding portion. Further, since the thick lubricating oil film is kept in the sliding gap 6 as the result, it is possible to reduce a friction between the opposing sliding member 4 and the sliding surface 2.

Figure 6:
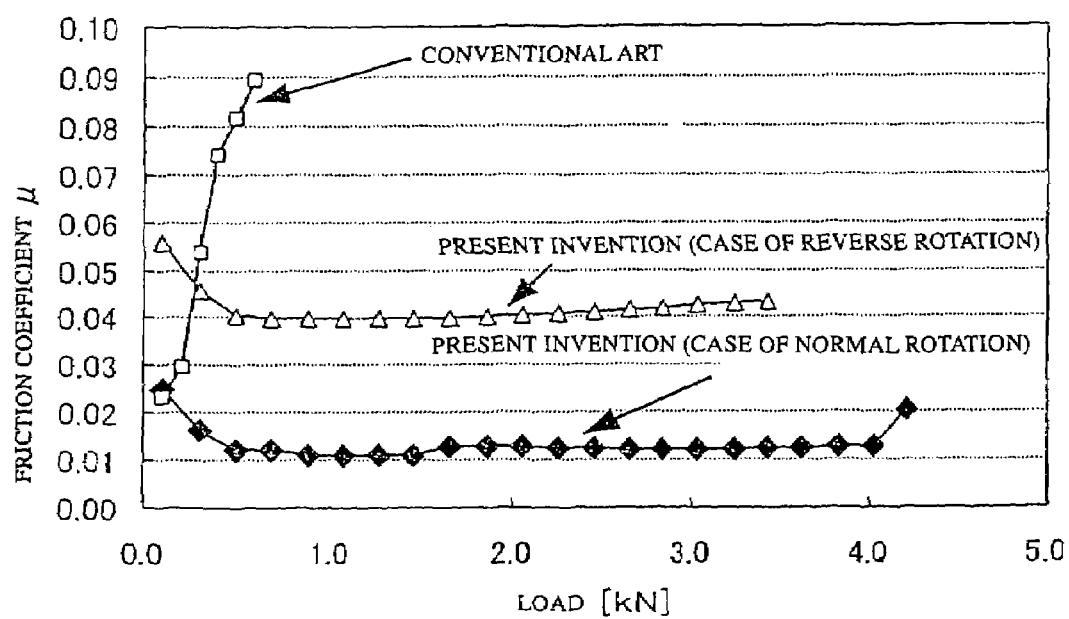
FIG. 6 is an explanatory chart showing a result obtained by measuring a change of friction coefficient by thrust loads to the thrust bearing in accordance with the present invention and the thrust bearing in accordance with the conventional art.

FIG. 6 shows a result obtained by measuring a change of friction coefficient caused by thrust loads in the thrust bearing in accordance with the present embodiment and the thrust bearing in accordance with the conventional art. On the basis of the test result, it is confirmed that the thrust bearing in accordance with the present embodiment is indicative of a low friction and stable bearing performance, while the thrust bearing in accordance with the conventional art is indicative of a rapid increase of the friction coefficient even under the small thrust loads. Further, it is known that the thrust bearing in accordance with the present embodiment maintains a comparatively low friction coefficient owing to a sufficient cooling effect of the lubricating oil, even in the case that the thrust bearing is reverse rotated, that is, the relative rotating direction of the opposing sliding member is set to the opposite direction to the arrow S in FIG. 4B.

Figure 7A:
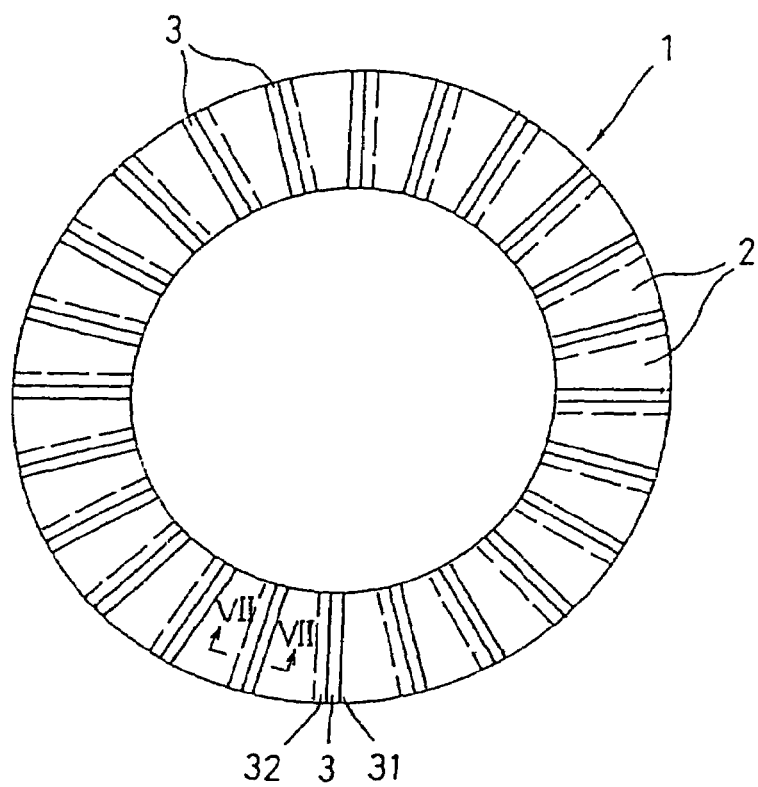
Figure 7B:
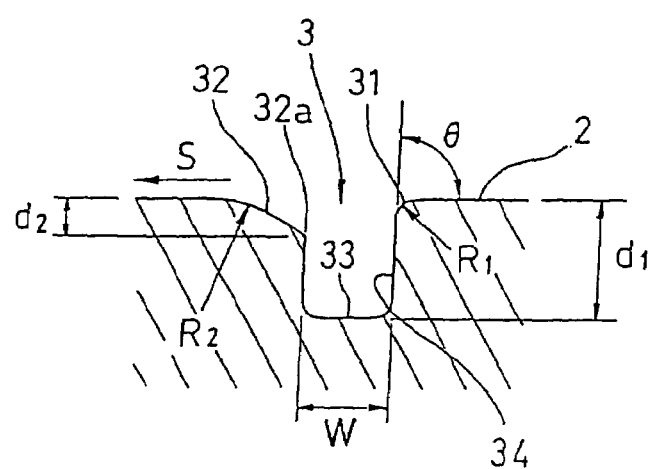

FIGS. 7A and 7B show a thrust bearing in accordance with a second embodiment, in which FIG. 7A is a front view as seen from the side of a sliding surface, and FIG. 7B is a partly enlarged cross sectional view cut along a line VII—VII in FIG. 7A. The thrust bearing 1 in accordance with this embodiment is employed in a structure in which the opposing sliding member relatively rotates in the reverse direction to that in FIGS. 1A and 1B, that is, in a clockwise direction in FIG. 7A. A cross sectional shape of each of the lubricating grooves 3 is formed in a symmetrical cross sectional shape to that of FIG. 1B described above, with respect to a circumferential direction. Accordingly, the same operation and effect as those of the first embodiment can be achieved.

Figure 8A:
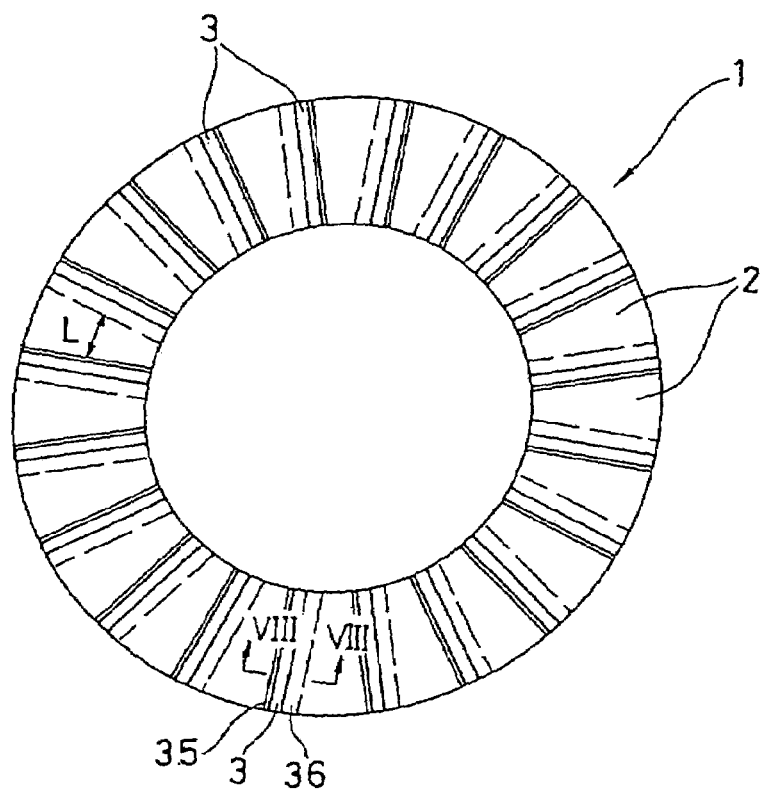
Figure 8B:
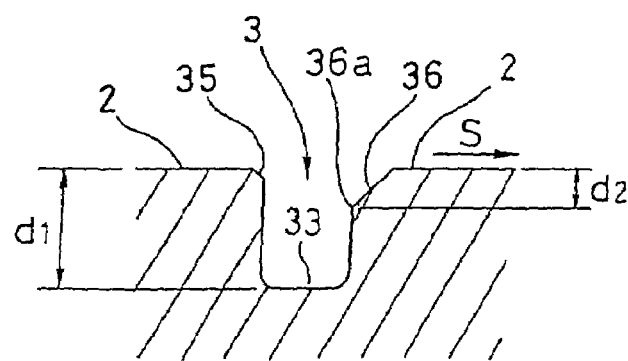

FIGS. 8A and 8B show a thrust bearing in accordance with a third embodiment of the present invention in which FIG. 8A is a front view as seen from the side of a sliding surface. and FIG. 8B is a partly enlarged cross sectional view cut along a line VIII—VIII in FIG. 8A. The present embodiment is structured such that an angled surface 36 having a depth d2 from starting print 36a is formed in the forward side with respect to the relative rotating direction S of the opposing sliding member. Further, an opposed angled surface 35 is formed in the groove shoulder in the rearward side with respect to the relative rotating direction S of the opposing sliding member.

Figure 9A:
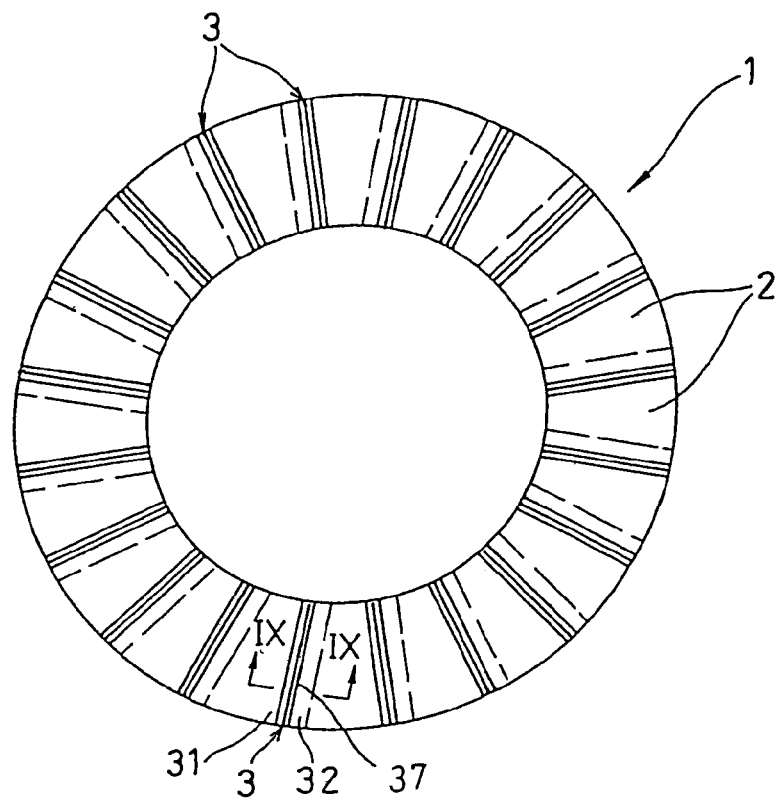
Figure 9B:
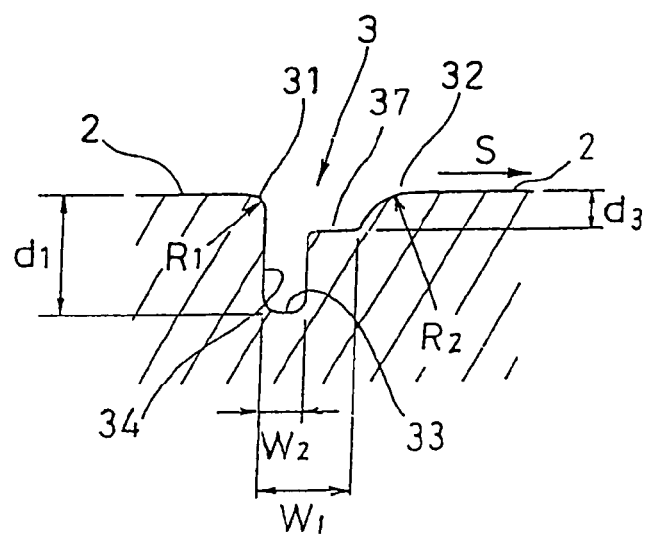

FIGS. 9A and 9B show a thrust bearing in accordance with a fourth embodiment of the present invention, in which FIG. 9A is a front view as seen from the side of a sliding surface, and FIG. 9B is a partly enlarged cross sectional view cut along a line IX—IX in FIG. 9A. The present embodiment is structured such that a step portion 37 having a depth d3 is formed in the forward side with respect to the relative rotating direction S of the opposing sliding member. Further, in the same manner as that in FIGS. 1A and 1B, the first curved surface 31 having the radius R1 of curvature of 0.5 mm or less is formed in the groove shoulder in the rearward side with respect to the relative rotating direction S of the opposing sliding member, and the second curved surface 32 having the radius R2 of curvature which is substantially larger than the radius R1 is formed in the groove shoulder in the forward side. Further, a groove width W2 between the groove inner wall 34 and the step portion 37 is set to be about a half of a groove width W1 between the groove inner wall 34 and the rising portion of the step portion 37.

Therefore, in accordance with the present embodiment, since the lubricating oil introduced into the lubricating groove 3 is introduced into the sliding surface 2 from the second curved surface 32 via the step portion 37, the lubricating oil is further easily interposed in the sliding gap, and an improved bearing effect can be obtained. In this case, the step portion 37 may be formed, in the same manner, in the structure in which a chamfer portion is formed in place of the first curved surface 31.

Figure 10A:
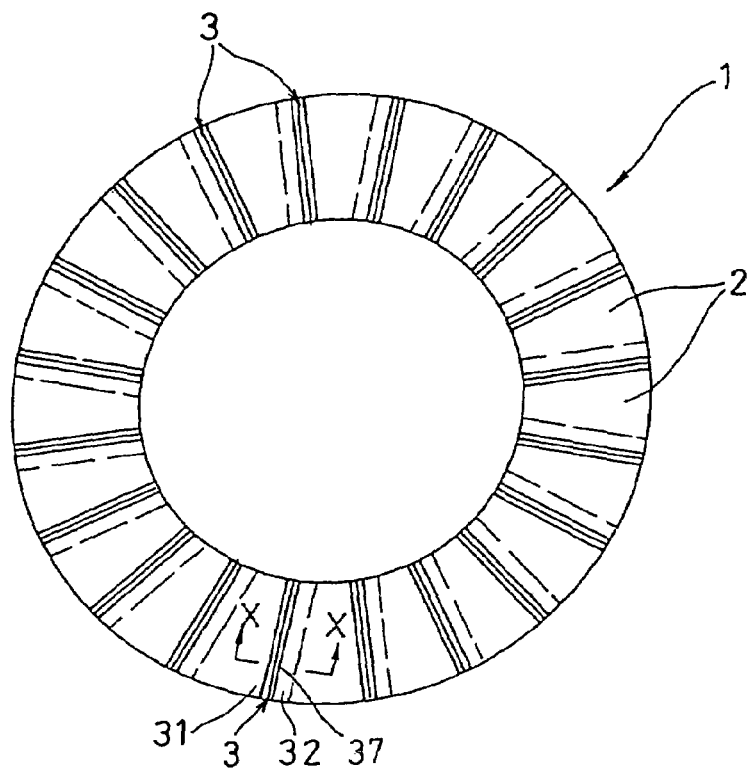
Figure 10B:
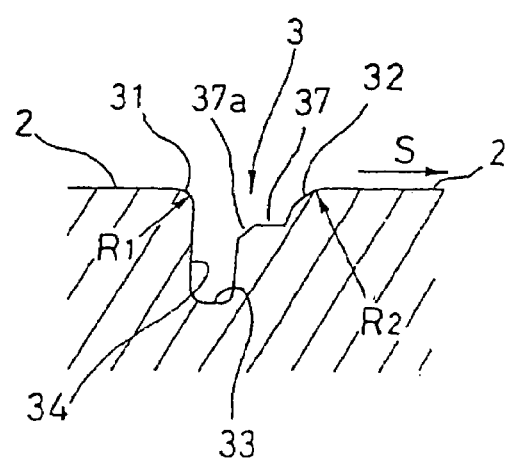

FIGS. 10A and 10B show a thrust bearing in accordance with a fifth embodiment of the present invention, in which FIG. 10A is a front view as seen from the side of a sliding surface, and FIG. 10B is a partly enlarged cross sectional view cut along a line X—X in FIG. 10A. The present embodiment is structured such that a chamfer portion 37a is formed in a shoulder portion of the step portion 37 in accordance with the fourth embodiment shown in FIGS. 9A and 9B mentioned above. The other structures are the same as those in FIGS. 9A and 9B. Accordingly, in the same manner as the embodiment shown in FIGS. 9A and 9B, the lubricating oil well runs over the step portion 37 from the side of the groove bottom 33, so that an improved bearing effect can be obtained.

In this case, in FIGS. 9A, 9B, 10A and 10B, only one step portion 37 is formed, however, plural stages of step portions having different depths may be formed in such a manner as to be made shallower step by step toward the second curved surface 32.

Figure 11A:
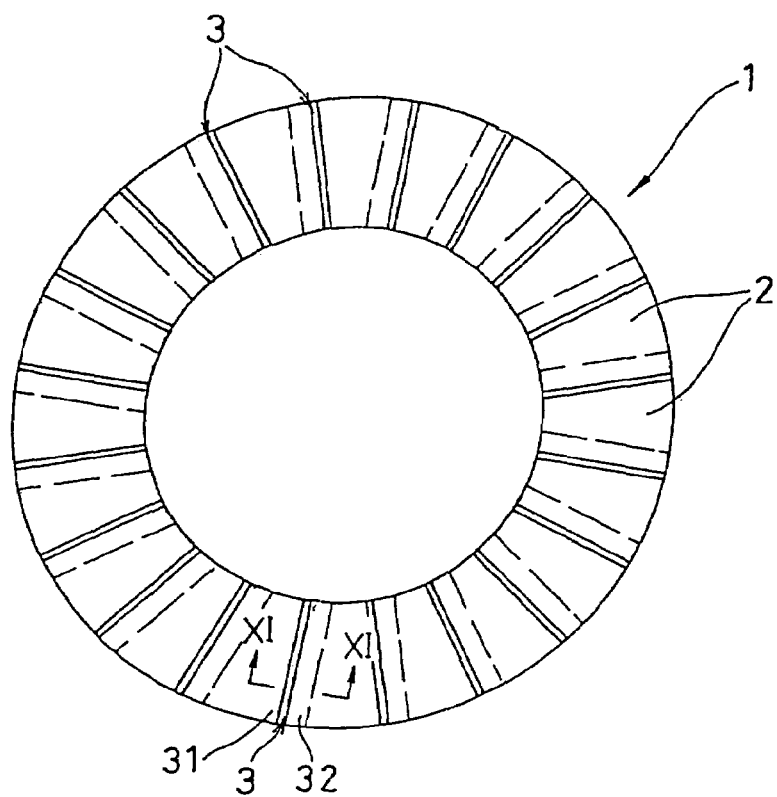
Figure 11B:
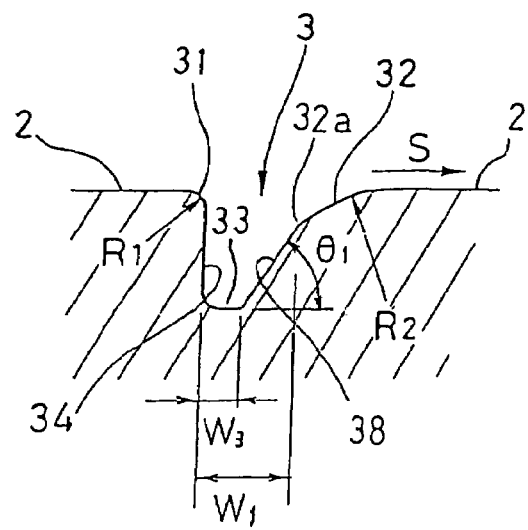

FIGS. 11A and 11B show a thrust bearing in accordance with a sixth embodiment of the present invention, in which FIG. 11A is a front view as seen from the side of a sliding surface, and FIG. 11B is a partly enlarged cross sectional view cut along a line XI—XI in FIG. 11A. The present embodiment is structured such thaf a groove inner wall in the forward side with respect to the relative rotating direction S of the opposing sliding member, that is, a groove inner wall 38 in the side of the second curved surface 32 is inclined at an angle θ1. Further, a groove width W3 of the groove bottom 33 is set to be about a half of the groove width W1 between the groove inner wall 34 and a starting point 32a in the side of the groove bottom 33 of the second curved surface 32. The other structures are the same as those in FIGS. 1A and 1B.

In accordance with the present embodiment, the sliding surface 2 of the thrust bearing 1 and the opposing sliding member facing to the sliding surface 2 in the thrust direction relatively rotate in the direction of the arrow S. Accordingly, the lubricating oil introduced into the lubricating groove 3 is introduced onto the sliding surface 2 from the second curved surface 32 in the forward side of the lubricating groove 3 with respect to the rotating direction S in such a manner that the lubricating oil is drawn in by the opposing sliding member, and the lubricating oil runs over the side of the second curved surface 32 from the groove bottom 33 so as to supplement it. In this structure, the flow of the lubricating oil becomes smoother than the case that the groove inner wall 38 is vertical to the sliding surface 2. Therefore, the lubricating oil is further easily interposed in the sliding gap, and an improved bearing effect can be obtained. In this case, the inclined groove inner wall 38 may be applied, in the same manner, to the structure in which the chamfer portion as shown in FIGS. 9A and 9B is formed in place of the first curved surface 31. the inclined groove inner wall 38 may be applied, in the same manner, to the structure in which the first chamfer portion 35 and the second chamfer portion 36 as shown in FIGS. 9A and 9B are formed.

Figure 12:
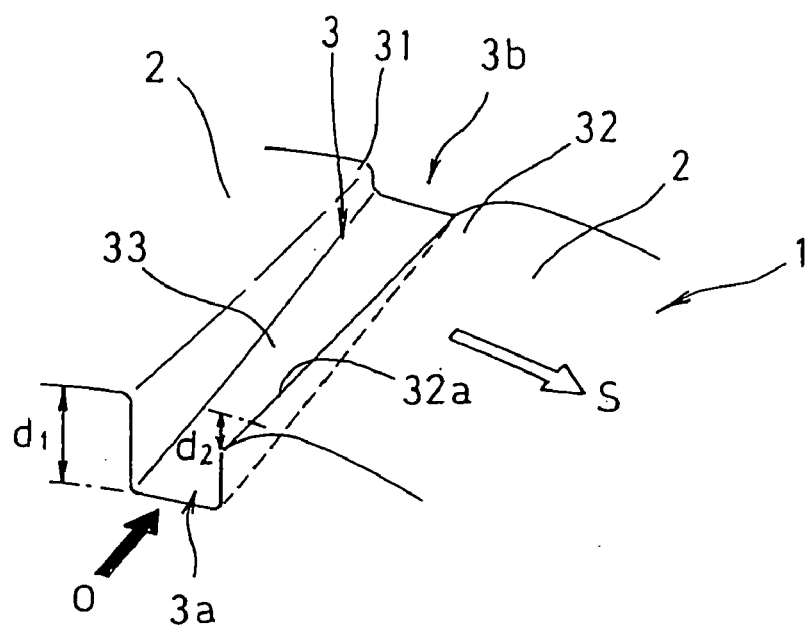
FIG. 12 is a partly perspective view showing a seventh embodiment of the thrust bearing in accordance with the present invention.

FIG. 12 is a partly perspective view showing a thrust bearing in accordance with a seventh embodiment of the present invention. In the present embodiment, the groove bottom 33 of each of the lubricating grooves 3 is formed so as to be made shallower gradually from the end portion 3a in the inner peripheral side of the thrust bearing 1 toward the end portion 3b in the outer peripheral side. A cross sectional shape of a center portion in a longitudinal direction of each of the lubricating grooves 3 is the same as that in FIG. 1B described above, that is, the first curved surface 31 having the radius of curvature of 0.5 mm or less is formed in the groove shoulder in the rearward side of the lubricating groove 3 with respect to the relative rotating direction S of the opposing sliding member facing to the sliding surface 2, and the second curved surface 32 having the radius of curvature which is substantially larger than that of the first curved surface 31 is formed in the groove shoulder in the forward side. Further, the depth d1 of the groove bottom 33 is deeper than the depth of the starting point 32a in the side of the groove bottom 33 in the second curved surface 32, at the end portion 3a in the inner peripheral side of the thrust bearing 1, and is similar to the depth d2 at the end portion 3b in the outer peripheral side. The other structures are the same as that in FIGS. 1A and 1B.

The opposing sliding member relatively rotates in the direction of the arrow S, whereby the centrifugal force is applied to the lubricating oil O existing on the periphery thereof. Accordingly, the lubricating oil O is introduced into the lubricating groove 3 from the inner peripheral side of the thrust bearing 1, that is, from the end portion 3a. At this time, in accordance with the embodiment shown in FIGS. 9A and 9B, since the groove bottom 33 becomes shallower in accordance with the movement of the lubricating oil O toward the outer peripheral side of the thrust bearing 1 within the lubricating groove 3, the lubricating oil O is efficiently introduced onto the sliding surface 2 from the second curved surface 32. Further, since the diminishing passage in which the cross sectional area is reduced gradually toward the outer peripheral side is formed between the lubricating groove 3 and the opposing sliding member, the lubricating oil O is pressurized in the process of moving toward the outer peripheral side of the thrust bearing 1 within the passage (the lubricating groove 3) on the basis of the centrifugal force. Accordingly, the bearing pressure is increased and an improved bearing effect can be obtained.

Figure 13:
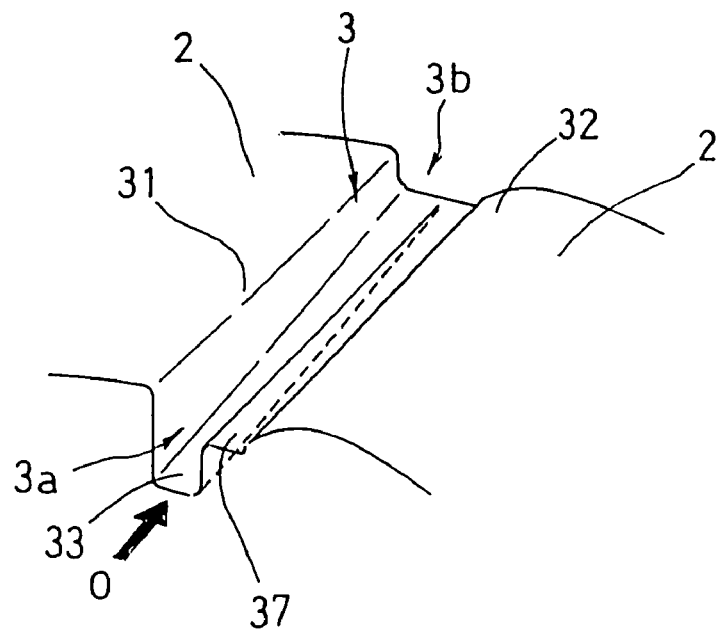
FIG. 13 is a partly perspective view showing a eighth embodiment of the thrust bearing in accordance with the present invention.
Figure 14A:
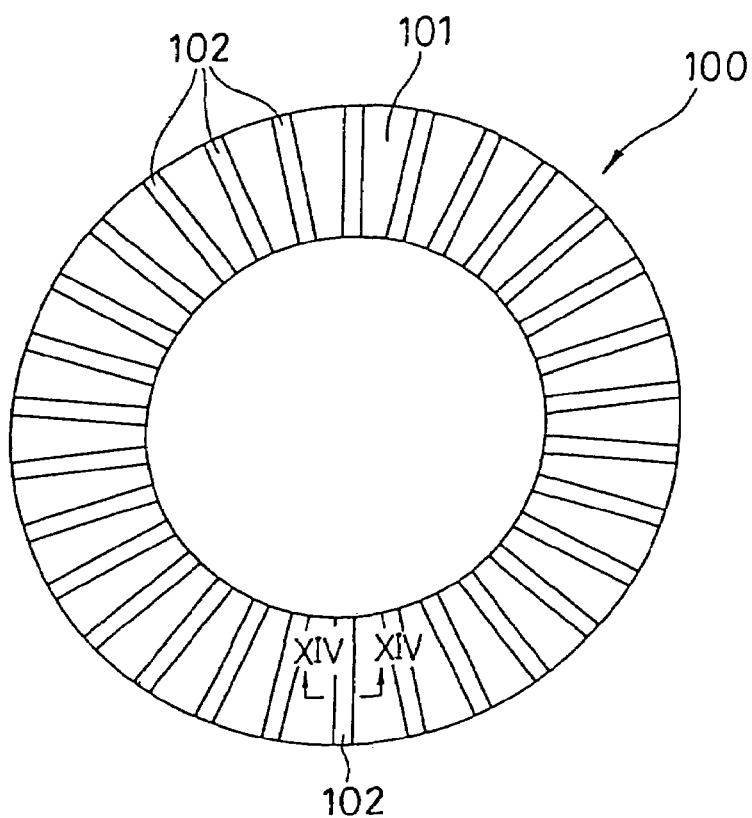
Figure 14B:
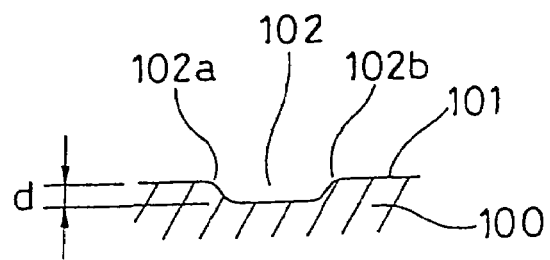

FIG. 13 is a partly perspective view showing a thrust bearing in accordance with an eighth embodiment of the present invention. The present embodiment corresponds to a structure in which the structure in FIG. 12 is applied to the embodiment shown in FIG. 9A and 9B mentioned above. In the present embodiment, the depth d1 of the groove bottom 33 is deeper than the step portion 37 at the end portion 3a at the inner peripheral side of the thrust bearing 1, and is similar to the depth of the step portion 37 at the end portion 3b in the outer peripheral side. Accordingly, in the same manner as that in FIG. 12, the groove bottom 33 is made shallower in accordance with the movement of the lubricating oil O toward the outer peripheral side of the thrust bearing 1 within the lubricating groove 3. Thus, the lubricating oil O is efficiently introduced onto the sliding surface 2 from the step portion 37 via the second curved surface 32, and is pressurized. Therefore, the bearing pressure is increased, and an improved bearing effect can be obtained.

Further, in each of the embodiments shown in FIGS. 10A, 10B, 11A and 11B, the structure may be made, in the same manner, such that the groove bottom 33 is made shallower gradually from the end portion in the inner peripheral side of the thrust bearing 1 toward the end portion in the outer peripheral side, whereby it is possible to further improve the bearing effect.

Further, in each of the embodiments in FIGS. 9A and 9B to FIG. 13, each of the lubricating grooves 3 may be formed in a symmetrical cross sectional shape with the illustrated shape, in correspondence to the relative sliding direction of the opposing sliding member.

In this case, the thrust bearing 1 in accordance with the present invention is not limited to the bearing means of the stator of the torque converter in the automatic transmission of the motor vehicle, and is useful for a thrust bearing of the other rotary equipment.

INDUSTRIAL APPLICABILITY

As described above, in accordance with the thrust bearing on the basis of the first aspect of the present invention, the curved surface which is larger than the size of the curved surface or the chamfer portion in the rearward side of the lubricating groove is formed in the groove shoulder in the forward side of the lubricating groove with respect to the relative rotating direction of the opposing sliding member. Thus, in the forward side of or the chamfer portion the lubricating groove, the lubricating oil tends to interpose into the sliding gap between the sliding surface and the opposing sliding member and the wedge effect of the lubricating oil is enlarged, and in the rearward side of the lubricating groove, the reverse wedge effect becomes significantly small. Therefore, it is possible to sufficiently reduce the friction with the opposing sliding member even in the case that the thrust bearing is made of the synthetic resin, and it is possible to provide a thrust bearing which is inexpensive and has an excellent bearing performance.

In accordance with the thrust bearing on the basis of the second aspect of the present invention, the depth of the lubricating groove is set to be deeper than the starting point in the side of the groove bottom of the curved surface or the chamfer portion formed in the groove shoulder in the forward side of the lubricating groove with respect to the rotating direction. Accordingly, the major part of the lubricating oil is supplied to the lubricating groove from both ends in the radial direction of the lubricating groove, and the lubricating oil is actively flown between the inner and outer peripheries of the thrust bearing and the lubricating groove, so that the cooling effect of the lubricating portion can be increased. Therefore, in this case, it is possible to achieve the reduction of friction by the thick lubricating film.

In accordance with the thrust bearing on the basis of the third aspect of the present invention, the step portion is formed in the forward side of the lubricating groove with respect to the relative rotating direction, of the opposing sliding member. Accordingly, it is possible to further increase the effects obtained by the first aspect or the second aspect of the present invention.

In accordance with the thrust bearing on the basis of the fourth aspect of the present invention, the groove inner wall in the forward side of the lubricating groove with respect to the relative rotating direction of the opposing sliding member is inclined. Accordingly, it is possible to further increase the effects obtained by the first aspect or the second aspect of the present invention.

In accordance with the thrust bearing on the basis of the fifth aspect of the present invention, the depth of the groove bottom of the lubricating groove is made shallower gradually from the end portion in the inner peripheral side toward the end portion in the outer peripheral side. Accordingly, the lubricating oil can be efficiently interposed into the sliding gap between the sliding surface and the opposing sliding member, and the lubricating oil moving to the outer peripheral side within the groove is pressurized by the centrifugal force, whereby the bearing pressure is increased. Therefore, it is possible to further increase the effects obtained by the first aspect to the fourth aspect of the present invention.

What is claimed is:

1. A thrust bearing comprising:
    a plurality of lubricating grooves formed on a sliding surface at a predetermined interval in a circumferential direction;
    curved surfaces formed in groove shoulders of each of the lubricating grooves,
    a size of the curved surface in a forward side of said lubricating groove with respect to a relative rotating direction of an opposing sliding member being set to be larger than a size of the curved surface or a chamfer portion in a rearward side of said lubricating groove with respect to said relative rotating direction; and
    a step portion for enlarging a groove width toward the curved surface in a same side groove shoulder being formed in the forward side of the lubricating groove with respect to the relative rotating direction of the opposing sliding member.

2. A thrust bearing comprising:
    a plurality of lubricating grooves formed on a sliding surface at a predetermined interval in a circumferential direction;
    curved surfaces formed in groove shoulders of each of the lubricating grooves,
    a size of the curved surface in a forward side of said lubricating groove with respect to a relative rotating direction of an opposing sliding member being set to be larger than a size of the curved surface or a chamfer portion in a rearward side of said lubricating groove with respect to said relative rotating direction; and
    a groove inner wall in the forward side of the lubricating groove with respect to the relative rotating direction of the opposing sliding member being inclined such that a groove width is enlarged toward the curved surface in a same side groove shoulder.

* * * * *